United States Patent [19]

Franklin et al.

[11] Patent Number: 4,766,323

[45] Date of Patent: Aug. 23, 1988

[54] METHOD AND APPARATUS FOR DETERMINING THE DISTANCE OF AN OBJECT

[75] Inventors: Douglas E. Franklin, Abbotsford; Gordon I. Frank, North Vancouver; Richard A. Palylyk, Surrey; Paul O. Toom, Delta, all of Canada

[73] Assignee: B. C. Hydro, Vancouver, Canada

[21] Appl. No.: 902,360

[22] Filed: Aug. 29, 1986

[51] Int. Cl.$^4$ .................. G01N 21/86; G01V 9/04; G01C 3/00

[52] U.S. Cl. .................. 250/561; 250/237 G; 250/231 SE; 356/1; 356/4; 356/28

[58] Field of Search ............. 250/561, 231 SE, 237 G; 356/1, 4, 28, 141, 152

[56] References Cited

U.S. PATENT DOCUMENTS

| | | | |
|---|---|---|---|
| 3,023,317 | 2/1962 | Willits et al. | 356/28 |
| 3,180,205 | 4/1965 | Heppe et al. | 356/1 |
| 4,329,047 | 5/1982 | Kikuchi et al. | 356/4 |
| 4,652,121 | 3/1987 | Ito et al. | 356/28 |

Primary Examiner—David C. Nelms
Assistant Examiner—Michael Messinger
Attorney, Agent, or Firm—Townsend & Townsend

[57] ABSTRACT

The present invention provides a method and apparatus to determine the position, velocity and orientation of an object with respect to an observation point. It consists of placing a sensor spaced from the object and placed at the observation point which will emit two non-parallel beams of light toward the object. Retroreflectors on the object will reflect the light in opposite direction to generate pulses of reflected light caused by the angular relative motion between the incident beam of light and the retroreflectors. A processor can be used to provide an indication of the position, velocity and orientation of the object based on the time interval between reflected pulses.

18 Claims, 4 Drawing Sheets

METHOD AND APPARATUS FOR DETERMINING THE DISTANCE OF AN OBJECT

FIELD OF THE INVENTION

This invention relates to a method and apparatus to determine the position, velocity and orientation of an object with respect to an observation point. The invention finds particular application in measuring gaps between the rotating and stationary components of rotating machines, for example in electrical generators or motors.

DESCRIPTION OF THE PRIOR ART

In many circumstances it is important to be able to accurately measure the distance or orientation of an object and desirable to do so without making physical contact with the object. Many procedures to measure the distance or proximity of an object without making contact are known in the literature and are based on induced electrical currents, or magnetic fields, or optical techniques.

Methods to determine distance based on induced electrical currents or magnetic fields are unsuitable for accurately measuring the air gap between the rotating and stationary components of electrical generators or motors because they are affected by electrical and magnetic effects within the region being measured. Optical methods, that employ light or other means of radiation are well suited to this application.

Examples of optical procedures in the patent literature to measure the distance between an object and an observation point include U.S. Pat. Nos. 4,425,043 to Van Rosmalen; 4,358,960 to Porter; 4,325,638 to Takeda; 4,076,376 to Slaughter; 4,281,931 to Chikima; 3,900,738 to McKay; 3,553,861 to Albarda; 4,070,116 to Frosch; and 3,715,165 to Smith.

The above prior art shows, in many instances, the use of light beams as a means of measuring distances without making physical contact with the object. However these patents, in general, depend upon (a) the intensity of a light beam being influenced by the distance to be measured; (b) the position of a light beam as determined by an array of light sensitive devices; or (c) the position of an optical image produced by an ocular lens as determined by an array of light sensitive devices. In the latter two circumstances the position of the light beam is influenced by the distance to be measured.

SUMMARY OF THE INVENTION

No method has achieved general acceptance and there remains a need for accurate, consistent and non-intrusive measurement of a gap for the described application. The present invention accordingly provides a method and apparatus that rely not on the detection of the absolute intensity of a light beam, nor on the detection of the position of a light beam or the position of an optical image, but on the measurement of time intervals between pulses of light reflected from the object.

It is a general object of this invention to provide an improved system for measuring the distance or orientation of any object with respect to an observation point, whether the object and observation point are moving relative to each other, or stationary, without physical contact between the object and the observation point.

It is a more specific object of this invention to provide an improved method and apparatus to accurately measure clearance or gap between the rotating and stationary parts of rotating machines to detect a variety of undesirable conditions which could lead to damage or excessive wear in these machines.

It is an additional object of this invention to provide means for accurately determining the rotational speed of rotating machines such as electrical generators, to detect small variations in the rotational speed which could be the result of torsional or other vibrations in the machine, and which could cause undesirable fluctuations in the electrical power output by the machine.

Accordingly, one aspect of the present invention is to provide an apparatus to measure the position, velocity and orientation of an object with respect to an observation point, the apparatus comprising (a) sensor means spaced from the object and placed at the observation point and adapted to emit at least two incident, non-parallel beams of radiation towards said object; (b) retroreflecting means mounted on said object, to reflect said beams of radiation oppositely to generate at least one pulse of reflected radiation caused by the angular relative motion between the incident beams of radiation and said reflecting means; (c) said sensor being adapted to receive the reflected pulses and produce at least one electrical signal representing the duration of the reflected pulses; (d) means coupled to said sensor to process said electrical signal for providing an indication of the position, velocity and orientation of said object.

The present invention also provides a method to determine the position, velocity and orientation of an object with respect to an observation point, comprising the steps of: (a) emitting at least two non-parallel incident beams of radiation towards the object from a sensor at the observation point spaced from the object; (b) mounting retroreflecting means on the object to reflect the incident beams of radiation oppositely to generate at least one pulse of reflected radiation; (c) causing angular relative motion between the incident beams of radiation and said reflecting means; (d) receiving said reflected pulses at the sensor and measuring the duration and time intervals between said reflected pulses upon receipt of the reflected radiation by the sensor; (e) processing said measured time intervals to produce an indication of the position, velocity and orientation of said object.

DRAWINGS

These and other objects of this invention will appear hereinafter and for purposes of illustration, but not of limitation, specific embodiments of the invention are shown in the accompanying drawings in which.

DESCRIPTION

Figure 1:
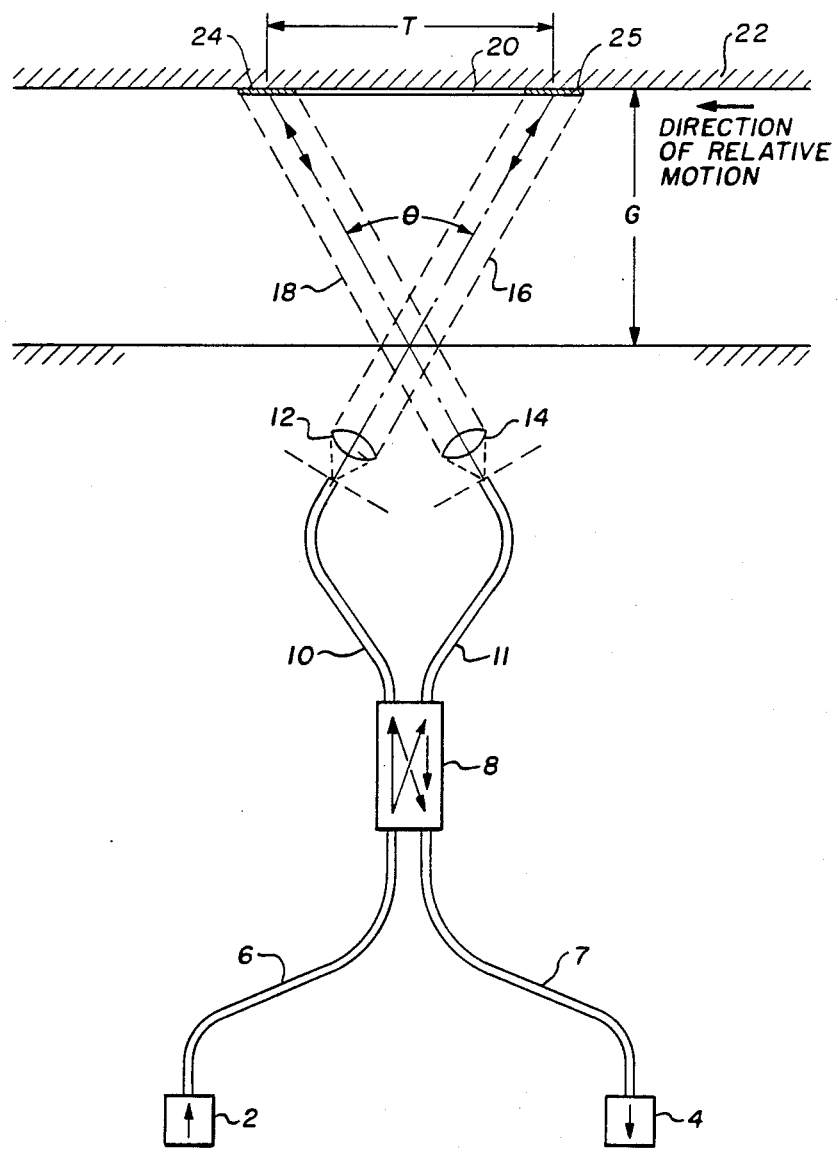
FIG. 1 is a schematic view of an apparatus according to the present invention.

FIG. 1 shows an apparatus according to the present invention comprising a sensor at the point of observation and a retroreflector on the object. The sensor consists of a source of radiation, such as a light, emitted from a diode or a laser diode 2, and a means of detecting light such as a photodetector 4. An optical fiber 6 extends from the source 2 to a four-port coupler 8 and an optical fiber 7 extends from the four-port coupler 8 to the detector 4. Optical fibers 10 and 11 extend from the four-port coupler to lenses 12 and 14 which are fixed relative to the ends of the fibers 10 and 11. Lenses 12 and 14 produce beams of light 16 and 18 which extend at an angle $\theta$ to each other. It will be understood that any form of radiation which can be transmitted through a vacuum, or a fluid or solid material can be used.

It will also be understood that the term "optical fiber" is intended to apply to either single or multiple strands of fiber, and that the two incident beams can be produced by a single lens as well as the two lenses illustrated. For example, a double concave or convex lens can be used to produce non-parallel beams.

The retroreflector 20 is a rectangle facing the sensor, and is mounted on the object 22. The distance to be measured is G.

The retroreflector 20 comprises, in this particular embodiment, two parallel, narrow reflective strips 24 and 25, separated by a distance T normal to the axis of the sensor, and positioned at right angles to the plane of the beams 18 and 16. The retroreflective material in this embodiment comprises an array of glass microspheres mounted on an adhesive backing.

Relative motion between the sensor and the object is illustrated by the arrow head, which in this example represents movement of the object past the sensor.

In use, the source 2 directs light towards the optical fiber 6 extending from the source 2 to the four-port coupler 8. Within the four port-coupler 8 the light entering from fiber 6 is split so that it emerges along the two optical fibers 10 and 11 which direct the light towards the lenses 12 and 14. These lenses produce two co-planar beams of light 16 and 18 extending at an angle $\theta$ to each other. The sensor and retroreflector are positioned so that relative motion results in the two reflective strips 24 and 25 intercepting both beams 16 and 18.

In the direction of motion illustrated by the arrow head in FIG. 1, beam 16 would first intercept reflective strip 24. As the retroreflector moves further beam 18 would intercept strip 24 and beam 16 would then intercept strip 25. In some cases, depending on the distance G and/or the angle $\theta$, these two interceptions could occur in the reverse order. FIG. 1 illustrates a particular configuration where beams 16 and 18 intercept strips 24 and 25 simultaneously. It will be understood that relative motion will not necessarily result in this particular configuration at any instant. As the retroreflector moves still further, beam 18 would then intercept strip 25.

The retroreflective material in strips 24 and 25 reflects light back in the incident direction, therefore reflected beams of light are briefly directed in the opposite direction along paths 16 and 18 as the strips 24 and 25 move past the sensor. These brief oppositely directed beams are converged by the lenses 12 and 14 into the optical fibers 10 and 11, and travel to the four-port coupler where they are split and a portion emerges along fiber 7 towards the detector 4. As indicated previously, lenses 12 and 14 could be replaced by a single double-concave lens or a double convex lens. Therefore, when using either lenses, optical fibers 10 and 11 would be placed parallel to each other such that for a double-convex lens, beams 16 and 18 would converge or bend towards the axis of the lens and for a double-concave lens, beams 16 and 18 would diverge or bend away from the axis of the lens. Movement of the illustrated retroreflector past the sensor therefore causes up to four pulses of light to be received by the detector 4.

Upon receipt of the reflected pulses, detector 4 produces electrical signals representing the duration of each of the four pulses and the time interval between said pulses. Said time intervals between these four pulses can then be processed to produce a signal that represents the distance of the object from the observation point. This process is known in the art and need not be discussed further.

In another embodiment, position of a stationary object from a stationary observation point could also be measured by causing angular relative motion of the incident beams of radiation with respect to the retroreflections. This could be achieved by either optical or mechanical means where the direction of the incident beams would be adapted to move with respect to one or more retroreflectors without the movement of either the sensor or the object.

Figure 2:
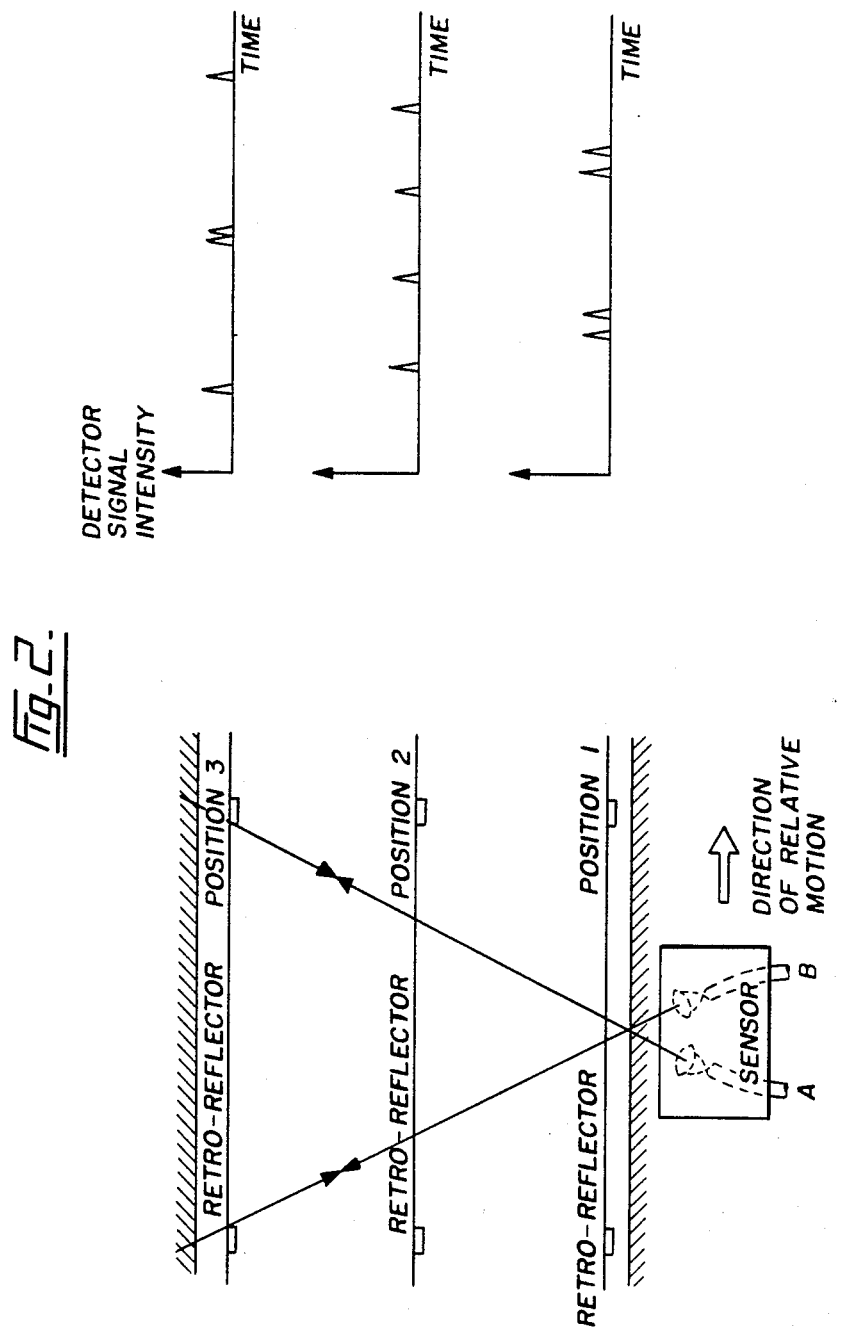
FIG. 2 is a schematic and graphical illustration of the various results that can be achieved with the apparatus of FIG. 1.

FIG. 2 illustrates how the positions in time of the reflected beams change with varying distances between sensor and object. Relative motion between the sensor and the retroreflector is illustrated by the arrow head, which in this example represents movement of the sensor past the object.

The resulting electrical signals or pulses for each of the three different distances of the retroreflector from the sensor is shown.

The range over which the apparatus can operate is of course, not limited to the distances shown in this illustration.

Figure 3:
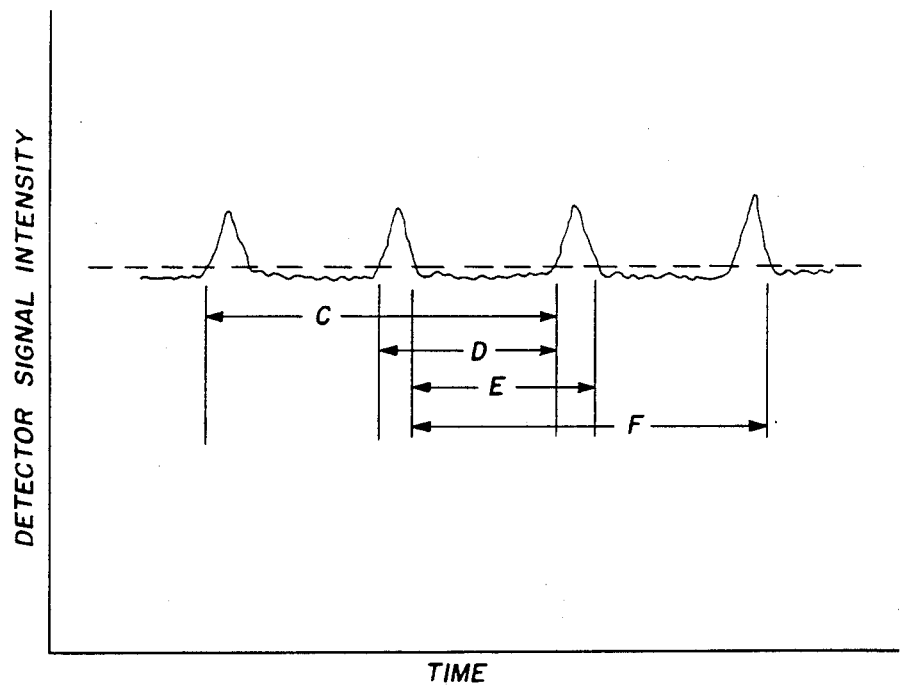
FIG. 3 is a graphical illustration of the results achieved with the apparatus of FIG. 1.

FIG. 3 graphically illustrates the electrical signals produced by detector 4 with respect to time. The time interval between the start of the first and third pulse is shown as distance C, between the start of the second and third pulse as distance D, between the end of the second and third pulse as distance E, and between the end of the second and fourth pulse as distance F. If there are no experimental errors, and the angular velocity remains constant, C equals F and D equals E.

In practice, the electrical signals consist of triangular shaped peaks of varying heights and some superimposed noise as shown in FIG. 3. Accuracy is improved by measuring the time intervals between points where the triangular peaks intersect a base signal level shown by the dashed horizontal line, and by averaging. Accuracy is also improved by employing means to automatically equalize the magnitude of the triangular peaks and by collimating the incident beams 16 and 18 shown in FIG. 1.

For the measurement of clearances in a rotating machine the angle between the beams and the spacing between reflective strips is selected so that the total time period illustrated in FIG. 3 is small compared to the time period for a single revolution of the machine. In this case the angular velocity remains sufficiently constant over the relatively short measurement interval and the distance G can be determined accurately even when the rotation is accelerating or decelerating.

Mathematically, the distance G shown in FIG. 1 can be expressed as follows, for constant angular motion:

$$G = K(1 - [D+E]/[C+F])$$

where $$K = T/(2 \tan[\theta/2])$$

T is the separation, centre to centre, of the two narrow retroreflective strips 24 and 25 and $\theta$ is the angle between the two beams 16 and 18. The average relative velocity V is:

$$V = 2T/(C+F) \ .$$

If a large number of retroreflectors are placed around the circumference of a rotating machine the velocity can be calculated as each retroreflector moves past the sensor, using the equation above. This method can be used to detect speed variations which may exist within each revolution.

Direction of rotation may be determined by employing strips 24 and 25 of different widths.

FIGS. 4a to 4e illustrate alternative forms of retroreflectors. It is understood that other retroreflector shapes could also be used. The first retroreflector 42 in FIG. 4a, comprises two narrow, parallel strips 43 of retroreflective material and separated by non-reflective material 44 and is equivalent to retroreflector 20 illustrated in FIG. 1. The advantage of using two parallel strips 43, separated by a known spacing 44, is that the time intervals between the resulting four pulses can be processed to determine distance without an independent measure of speed. A retroreflector which comprises only a single narrow strip could be used to determine distance, if an independent measure of speed is also available.

Figure 4A:
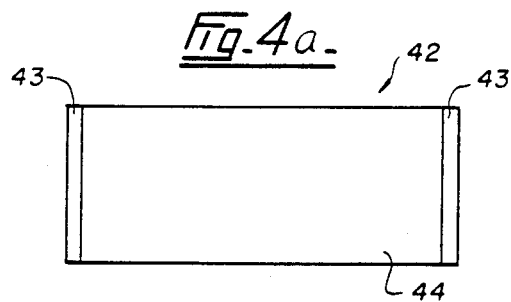
FIGS. 4a to 4e are schematic illustrations of alternative retroreflectors.
Figure 4B:
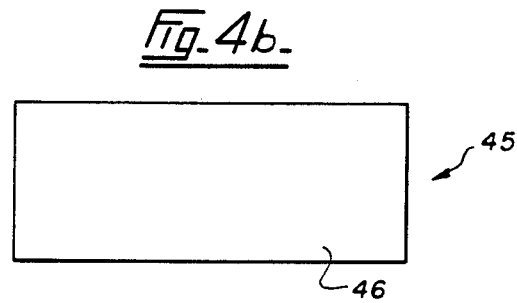

Retroreflector 45 shown in FIG. 4b is made of a single, wide retroreflector 46, which produces two broad overlapping pulses rather than four narrow peaks as illustrated in FIG. 3. Measurements of the overlapping signals from this type of retroreflector can also be used to measure the distance G.

Figure 4C:
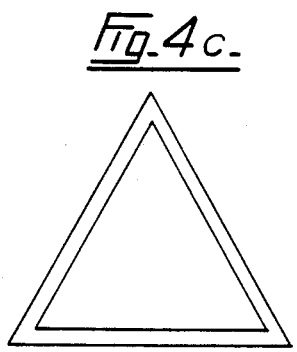

Using a retroreflector such as shown in FIG. 4c, movement of the object in a plane normal to the axis of a single sensor can be detected using the non-parallel form of retroreflector provided that the distance G remains constant. Using more than one sensor and the triangular or other non-parallel form of the retroreflector with suitable mathematical algorithms would allow simultaneous measurement of distance and orientation of the object.

Figure 4D:
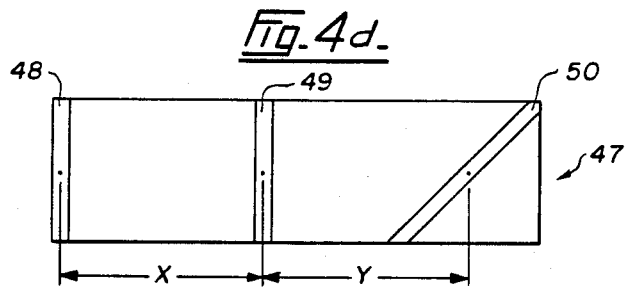

FIG. 4d illustrates an alternative retroreflector 47 which consists of three narrow retroreflective strips.

Strips 48 and 49 are parallel to each other and similar in configuration to retroreflector 42 shown in FIG. 4a. A non-parallel strip 50 can be provided to not only measure distance G but also relative movement between the object and observation point in a plane normal to the axis of the beam of radiation.

It can be readily understood from this configuration that during ideal operating conditions, when a beam of radiation is reflected from the centre of strips, that distances X and Y between reflected pulses will always be equal unless there is a lateral relative movement of the object with respect to the sensor.

For example, if the object moves in the upward direction relative the sensor, then Y will be less than X. On the other hand if the object moves in the downward direction relative the sensor, Y will be greater than X thereby giving an indication of lateral movement of the object relative to the observation point.

Figure 4E:
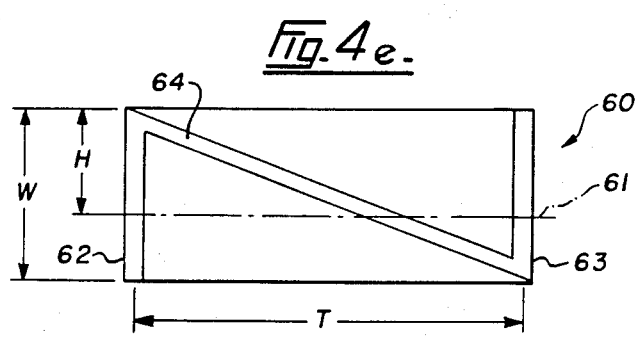

Yet another retroreflector is illustrated at reference numeral 60 in FIG. 4e. This retroreflector allows the same type of measurements to be made. Broken line 61 represents the plane of light beams from the sensors.

Figure 5:
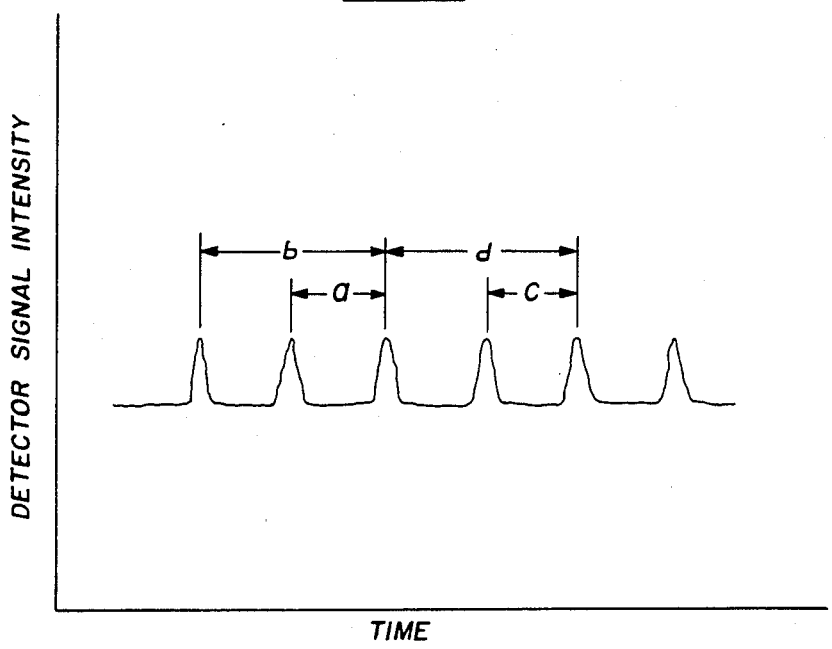
FIG. 5 is a graphical illustration of results achieved using a retroreflector as shown in FIG. 4e.

FIG. 5 graphically illustrates the electrical signals produced by a detector, such as shown at 4 in FIG. 1, with respect to time, when using retroreflector 60. In this case it is assumed that the first and second pulses are produced by the vertical strip 62, the third and fourth pulses by the diagonal strip 64 and the fifth and sixth pulses by the vertical strip 63. The distances a, b, c, and d represent the time intervals between these respective pulses. If the configuration were such that the strips produced pulses in a different order the distances a, b, c and d could be obtained by identifying the strips 62, 63 and 64 by varying their widths or by using reflective material of different colours.

Mathematically, the distance G shown in FIG. 1, using retroreflector 60, can be expressed as follows, for constant angular motion:

$$G = K[1 - a/b + d]$$

where $$K = T/[2 \tan(\theta/2)]$$

T is the separation, centre to centre, of end strips 62 and 63 and $\theta$ is the angle between the sensor beams 16 and 18 shown in FIG. 1.

The vertical distance H is given by $$H = W/T[T/(b+d) + 2K/a]$$

where dimension W is shown in FIG. 4e.

Accordingly, the use of this algorithm in conjunction with retroreflector 60 permits the measurement of distance G and also vertical displacement H simultaneously.

The apparatus has been described with reference to the measurement of the air gap or clearance between the rotor and stator of an electrical generator while the generator is in operation. In this application the apparatus invented performs the measurement accurately and non-intrusively, that is, without affecting the operation of the electrical generator, and is insignificantly affected by the large electrical and magnetic effects in the region being measured. For this application, the invention can be adapted to measure rotational speed and direction.

It will be understood that the invention applies to the measurement of the distance of any object with reference to an observation point. A sensor adapted to emit and receive beams of radiation is placed at the observation point; a retroreflector is placed on the object or the object itself acts as a reflector; and there must be some motion of the retroreflector with respect to the beams emitted by the sensor. The apparatus can be adapted to measure distance, speed and direction of motion, and can be performed with a single sensor. Also, using more than one sensor, measurement of orientation can be performed.

By adapting the sensor to scan a region where an object is located, measurement of the direction of the object can also be performed.

We claim:

1. A method to determine the position, velocity and orientation of an object with respect to an observation point, comprising the steps of:

(a) emitting at least two non-parallel incident beams of radiation towards the object from a sensor at the observation point spaced from the object;
(b) mounting retroreflecting means on the object to reflect the incident beams of radiation oppositely;
(c) causing relative motion between said retroreflective means and said incident beams of radiation, to intercept said incident beams for a finite time period thereby generating at least one pulse of reflected radiation;
(d) receiving said at least one pulse of reflected radiation at the sensor and measuring the duration and time intervals between received pulses;
(e) processing said measured time intervals to produce an indication of the position, velocity and orientation of said object.

2. A method as defined in claim 1 wherein said relative motion between said retroreflective means and said incident beams of radiation is caused when said object is in relative motion with respect to said sensor.

3. A method as defined in claim 1 wherein relative motion is achieved, between said retroreflective means and said incident beams of radiation, when said object and said sensor are stationary relative to each other by adapting said sensor to cause angular motion of said incident beams of radiation.

4. An apparatus to measure the position, velocity and orientation of an object with respect to an observation point, comprising:
(a) a sensor means spaced from the object and adapted to emit at least two incident, non-parallel beams of radiation towards said object;
(b) retroreflecting means mounted on said object, to intercept said beams oppositely during relative motion between said retroreflective means and said incident beams of radiation, generating at least one pulse of reflected radiation;
(c) said sensor means being adapted to receive said at least one pulse of reflected readiation and produce at least one electrical signal representing the duration and time interval between received pulses; and
(d) processing means coupled to said sensor for providing an indication of the position, velocity and orientation of said object.

5. An apparatus as defined in claim 4 wherein said retroreflecting means comprises a sheet of material with at least one retroreflective region.

6. An apparatus as defined in claim 5 wherein said retroreflective region comprises a first and second strip spaced apart and parallel to each other.

7. An apparatus as defined in claim 6 wherein said first and second strip are oriented at right angles to the plane containing said non-parallel incident beams.

8. An apparatus as defined in claim 7 wherein said plane containing said first and second strip is oriented at right angles to a line bisecting the angle between said non-parallel incident beams.

9. An apparatus as defined in claim 5 wherein said sheet of material comprises adhesive tape and said retroreflective region comprises a plurality of glass spheres bounded to said adhesive tape.

10. An apparatus as defined in claim 4 wherein said beams of radiation comprises beams of light.

11. An apparatus as defined in claim 10 wherein said sensor means is comprised of light emitting means for emitting light beams through lens means and photodetecting means for producing electrical signals representing the duration and time intervals of reflected light beams upon receipt by said photodetecting means.

12. An apparatus as defined in claim 4 wherein said sensor is aimed to ensure that the emitted beams are directed at the path of the retroreflector, when in use and on object, within the angular range of the retroreflector.

13. An apparatus as defined in claim 4 wherein said sensor means comprises a sensor adapted to emit at least two parallel beams of radiation through lens means such that said beams of radiation arriving at said object are non-parallel.

14. An apparatus as defined in claim 13 wherein said lens means is a double convex lens.

15. An apparatus as defined in claim 13 wherein said lens means is a double concave lens.

16. An apparatus as defined in claim 13 wherein said incident beams of radiation are in angular relative motion with said retroreflecting means.

17. An apparatus as defined in claim 16 wherein said object is in angular relative motion with said sensor means.

18. An apparatus as defined in claim 16 wherein said object and sensor are stationary relative to each other and said sensor is adapted to cause angular motion of said incident beams relative to said reflecting means.

* * * * *